United States Patent [19]

Glienke

[11] Patent Number: 4,927,436

[45] Date of Patent: May 22, 1990

[54] ROOM DEHUMIDIFIER

[75] Inventor: Peter O. Glienke, Baden-Baden, Fed. Rep. of Germany

[73] Assignee: Wenko-Wenselaar GmbH & Co. KG, Fed. Rep. of Germany

[21] Appl. No.: 302,779

[22] Filed: Jan. 30, 1989

[30] Foreign Application Priority Data

Jul. 22, 1988 [DE] Fed. Rep. of Germany ... 8809377[U]

[51] Int. Cl.$^5$ ............................................ B01D 53/20
[52] U.S. Cl. .......................................... 55/281; 55/388
[58] Field of Search ........................... 55/35, 281, 388

[56] References Cited

U.S. PATENT DOCUMENTS

| 2,702,089 | 2/1955 | Engelder | 55/388 |
| 2,994,404 | 8/1961 | Schifferly | 55/388 X |
| 3,248,861 | 5/1966 | Lovercheck | 55/281 |
| 4,394,144 | 7/1983 | Aoki | 55/281 |

FOREIGN PATENT DOCUMENTS

| 2234029 | 1/1975 | France. | |
| 2578444 | 9/1986 | France | 55/388 |
| 0110319 | 6/1985 | Japan | 55/388 |

Primary Examiner—Charles Hart
Attorney, Agent, or Firm—Sixbey, Friedman, Leedom & Ferguson

[57] ABSTRACT

A completely self-contained room dehumidifier having a water collector 1 that has an open top within which an abutment frame 2 for a water absorbent filler 3, consisting of hygroscopic material, particularly calcium chloride granulate, is suspended. The abutment frame 2 is in the form of a receptacle that has water drainage openings 4 facilitating drainage of water from the filler 3 into the water collector 1, when it becomes saturated with water absorbed from the ambient atmosphere. Furthermore, the water collector container 1 and absorbent receptacle 5 are designed as standard containers that are stackable one inside the other, with their widths and lengths, or diameters, being adapted to achieve this result, but, preferably, having different heights to create a water collection space within the collector 1, below a receptacle 5 nested therein.

19 Claims, 2 Drawing Sheets

ROOM DEHUMIDIFIER

BACKGROUND OF THE INVENTION

The invention relates to room dehumidifiers, in particular to a room dehumidifier of the type having an open topped water collection container with a water absorbent filter of hygroscopic material seated on a support frame that is suspended from the open top of the collection container.

Room dehumidifiers, of the type to which the present invention is directed, serve to absorb the humidity in the air and to collect it in the form of water in a water collecting container. The absorbent commonly used consists of low-cost calcium chloride, which not only has very good hygroscopic properties (i.e., water absorption capability), but also is provided in granular form, which makes for easy handling. Other hygroscopic materials in use are, for example, silica gel, aluminum oxide gel, etc. Now, as before, calcium chloride is the first choice for the normal, standard use, based on considerations of cost and ease of handling. However, there is a gradual deterioration of the hygroscopic properties in calcium chloride and a subsequent tendency towards clumping, characteristics which are also exhibited by other hygroscopic materials. Accordingly, there is a need to exchange the absorbent filler material at certain intervals.

In the conventional room dehumidifier, which this invention seeks to improve, the water collecting container consists of a simple water bucket, e.g., a household bucket. A support frame is suspended at the open upper side of the water collecting container by laterally adjustable hooks. The support frame has at least one water drainage opening and, preferably, has several water drainage openings. Frequently, the support frame is in the form of a lattice work, the openings of which constitute the water drainage openings. The water absorbent filler is encased in a tight-meshed netting which is loosely placed onto the support frame as an exchangeable part. Sometimes, a mat made of felt or similar material is inserted into the support frame, and the water absorbed in the water absorbent filler drains downwardly into the mat and then drips into the water collecting container.

The conventional dehumidifier described above is practical since the water collected in the water collecting container can simply be poured out after removal of the support frame along with the water absorbent filler, and since replacement of the water absorbent filler is very simple. However, manufacture and application of the conventional room dehumidifier in practice are still not at their optimum. This applies to the manufacture of the conventional room dehumidifier because the support frame with its adjustable hooks represents a relatively expensive part, and it pertains to the usage of the conventional room dehumidifier since the separation of the water absorbent filler from the support frame frequently entails problems in handling. Also, a person utilizing the room dehumidifier has to seek out a separate bucket for completion of the setup of the water collecting container, which bucket is then unavailable for usage in other household tasks.

SUMMARY OF THE INVENTION

It is the primary objective of the present invention to provide a completely self-contained room dehumidifier which is characterized by uncomplicated technical design and ease of handling.

This objective is achieved, in accordance with a preferred embodiment of the invention, by providing the absorbent in a receptacle that, itself, serves as the support frame of the dehumidifier, and which dispenses with the need for adjustable hooks for supporting itself on the container rim.

In accordance with the invention, instead of the support frame with adjustable hooks, a complete absorbent receptacle is provided which, like the water collection container, is open only at one side, i.e., is open to the top. The water absorbent filler fits into the absorbent receptacle without any difficulties, and to this end, the water collection container and the absorbent receptacle are configurationally adapted to each other, eliminating the need to utilize a household type bucket as a water collection container. In order to reduce the larger basic expense incurred with such an arrangement, and in order to arrive at resultant lower manufacturing costs, the invention provides that the water collection container as well as the absorbent receptacle are designed as standard containers which can be stacked one inside the other. Such standard stackable containers are produced in a wide variety of widths and lengths (or diameters) and heights extremely cost-effectively in very large quantities. Thus, standard containers that are configurationally adapted to each other can be used as water collection containers and absorbent receptacles to meet individual requirements. Widths, lengths, or diameters, respectively, of the standard containers utilized have to be matched to each other to facilitate stackable nesting of the receptacle within the container, while their heights, preferably, vary so that as the need arises, the same absorbent receptacle can be placed onto different individual water collection containers of different capacities, with a water collection space being created within the container below the receptacle, when it is nested therein.

From the aspect of handling, the inventive room dehumidifier is particularly easy in household use, since the water collection container is always part of the room dehumidifier, and the need to seek out a household bucket is eliminated.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
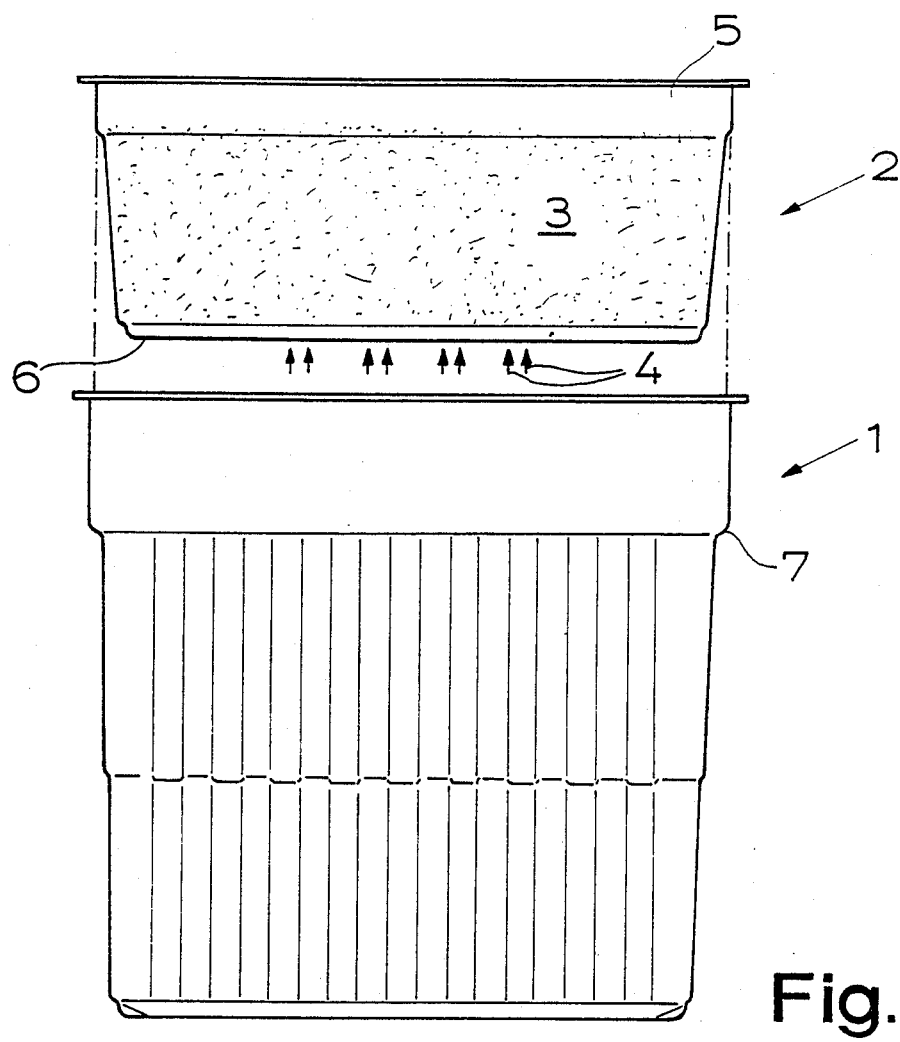
FIG. 1 is an exploded side elevational view of a preferred embodiment of the inventive room dehumidifier.
Figure 2:
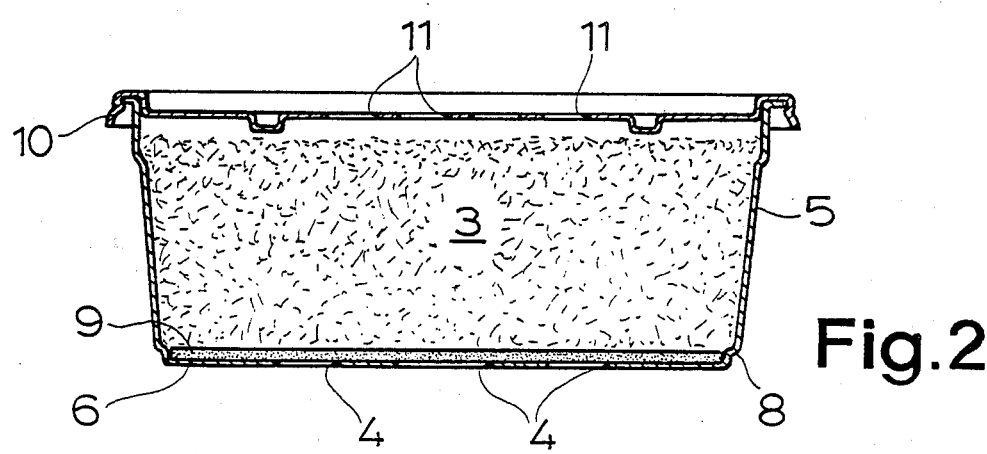
FIG. 2 is a sectional side view of the absorbent receptacle of the dehumidifier of FIG. 1.

Referring to FIG. 1, a room dehumidifier is shown having a water collector 1 in the form of a container which is open at its top end. A supporting frame 2 is formed as an absorbent receptacle 5 that can be suspended in the open end of the water collector 1, and within which a water absorbent filler 3, consisting of hygroscopic material, specifically a calcium chloride granulate, is provided as indicated in the drawing. Supporting frame 2 has drainage openings 4, merely indicated by arrows in FIG. 1 of the drawing, which enable water, taken up from the ambient atmosphere by water absorbent filler 3, to drain off through these openings 4, in the bottom 6 of receptacle 5, into the water collector 1, upon reaching the saturation point.

Standard containers which can be stacked inside each other may be used as the water collector 1 and absorbent receptacle 5, these containers being selected of widths and lengths, or diameters, which are correspondingly matched to each other so as to facilitate stackable nesting of the receptacle 5 within the collector 1, but, preferably, have different heights so as to create a water collection space within collector 1 below receptacle 5. In the example depicted, and in accordance with the preferred concept of the invention, water collector 1 and absorption receptacle 5 are formed of a plastic material, preferably one which is translucent enough to enable the water level within the water collector 1 to be viewed. In accordance with conventional practice for such containers, both can be manufactured by a deep drawing process. This process is very cost-effective, resulting in extremely low manufacturing costs for such standard stackable containers. Water collector 1 can be provided with reinforcing creases in order to withstand heavier loads with increased heights. The height of receptacle 5 is solely determined by the volume of the water absorbing filler material 3. The substantially increased height of water collector container 1 results in a considerable volume of water being collected before there is a need for emptying the container.

Another basic feature of the invention is that, instead of multiple drain openings 4 in bottom 6 of receptacle 5, a single drain opening can be provided. A more uniform drainage of water absorbent filler 3, however, is ensured by a plurality of distributed drain openings 4.

For suspending receptacle 5 in water collector 1, water collector 1 can simply be such that the open end has a perimetric abutment flange 13, and receptacle 5 has a support flange for seating on the abutment flange 13, or even a recessed abutment flange 7. This would represent a statically sound solution as such; however, since the support flange is formed by the rim 15 that surrounds the top of the absorbent receptacle, it means that the absorbent receptacle could only be removed from the water collector 1 with special handles or with great effort due to the rim 15 and abutment flange being superimposed on each other.

Removal, however, is necessary at certain intervals in order to dispose of the water collected in water container 1. The receptacle 5 can be easily lifted by rim 15 when the water absorbent container 1 is provided with a recessed abutment flange 7 which is offset from the open end of collector 1 by less than the height of receptacle 5, and receptacle 5 has a support flange 8 formed near its bottom end that is configured for seating on abutment flange 7. The support for receptacle 5 in the water collector 1, thus, occurs mainly at the lower edge of receptacle 5, so that the upper edge does not have to bear against an encircling abutment flange of water collector 1, and can be used for lifting the receptacle 5 out of collector 1. Optionally, also, an abutment bulge 17 may simultaneously or alternatively be used to provide support for the receptacle 5 on flange 13.

Regarding the ability to stack the containers, particularly in accordance with the preferred embodiment of the room dehumidifier described above, it is beneficial when the water collector, at least at its upper edge, is slightly conically shaped and/or the side walls of absorbent receptacle 5 have a slight conical configuration. Such a configuration enables the form-fitted receptacle, under its own weight, to glide into the support mounting formed in the upper portion of water collector 1.

The fact that abutment frame 2 of the room dehumidifier is in the form of a tub-like receptacle 5 results in another benefit from the standpoint of manufacture and usage. Now, it is no longer necessary to supply the water absorbent filler 3 in a tightmeshed net, but rather it can be provided in the form of a loose bulk that is filled into receptacle 5. Appropriately, the bottom 6 of receptacle 5 should be covered with a mat 9 which is permeable to water, and which may consist of foam, felt or cellulose felt. As indicated earlier, such mats are known per se. Mat 9 in receptacle 5 prevents hygroscopic material of the water absorbent filler 3 from passing into the water collector 1 through drainage openings 4. At the same time, mat 9 serves to collect the water to facilitate downward drainage.

In connection with the various materials, mentioned above, used for mat 9, it is important that the mat consist of an absorbent material. While it is not depicted in the drawing, mat 9 may be provided with hook-like protrusions on its upper surface, and if desired, also on its underside. The protrusions at the upper surface extend into the hygroscopic material and absorb water therefrom for downward drainage, which action counteracts the tendency of the hygroscopic material to clump, thereby extending its service life. The downwardly projecting protrusions promote the aimed dripping of the water into the water collector.

The standard containers used here, which can be stacked inside each other, have the advantage that routinely they are also supplied with standardized snap-fitted covers. In accordance with the invention, it is beneficial if absorbent receptacle 5 is closed by a cover 10 and that, preferably, the cover be provided with air inlet openings 11; and moreover, that the air inlet openings 11 be concentrated in the center region of cover 10. If the absorbent receptacle 5 is closed by a conventional cover, absorbent receptacle 5, initially, is closed airtight. This, in effect, means airtight sealing of water absorbent filler 3, so that in principle, this filler can be stored for extended periods of time. To "activate" the room dehumidifier, cover 10 could simply be taken off the receptacle 5. This, however, would be impractical when the water absorbent filler 3 is introduced as loose bulk material, since the water absorbent filler 3 would get soiled or scattered. Consequently, it is recommended to snap-fit cover 10 onto the absorbent receptacle 5 after filling it and thereafter not to separate the cover from the absorbent receptacle 5, at least until disposal of the filler 3 becomes necessary. In this case, the entry of air into the water absorbent filler 3 is facilitated by the air inlet openings 11 which, for technical reasons and design considerations, appropriately, should be concentrated in the center region of cover 10.

For considerations of transport and storage, it is of particular benefit when the water drainage openings 4, air inlet openings 11, and both the water drainage openings 4 as well as the air inlet openings 11, are sealed with a removable adhesive foil. This measure facilitates that the water absorbent filler 3 in receptacle 5 is practically nonperishable for unlimited time, until "activated" by the removal of the adhesive foils 12 at the time and place of desired operational use. When the adhesive foil is divided into segments extending over the surface, air inlet cross sections of varying sizes can be realized, resulting in the ability to "control" the hygroscopic effect of the water absorbent filler.

The above design of absorbent receptacle 5 means that it serves (in itself) as the packing and transport unit for the water absorbent filler 3. Thus, absorbent receptacle 5, and the water absorbent filler 3 contained therein, can also be separately supplied, as a refill set for the dehumidifier.

Figure 3:
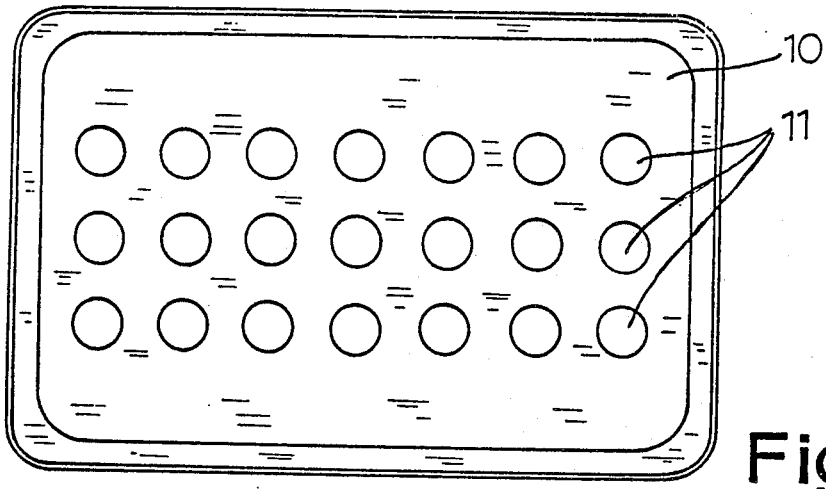
FIG. 3 shows a top view onto a first embodiment of a cover for an absorbent receptacle.
Figure 4:
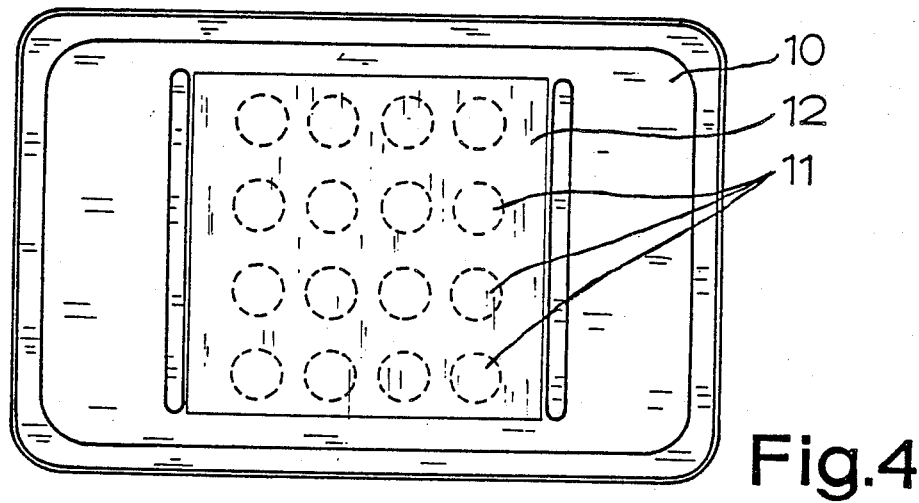
FIG. 4 is a view similar to FIG. 3, but of the cover shown in FIG. 2.
Figure 5:
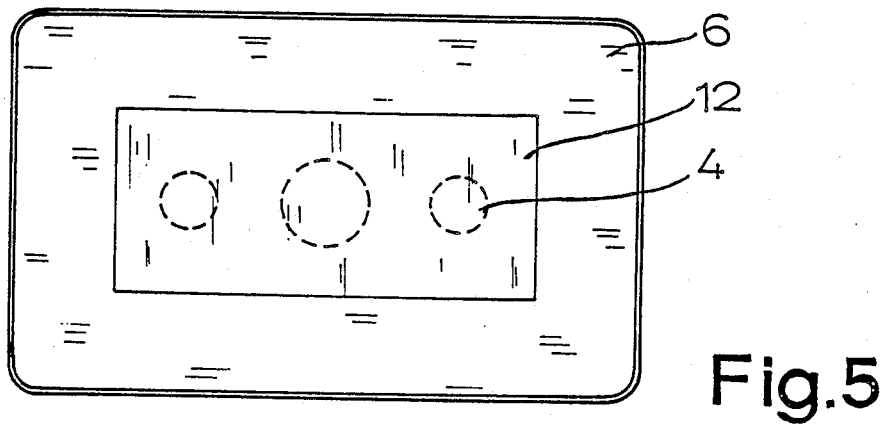
FIG. 5 is a bottom view of the absorbent receptacle for a room dehumidifier of FIG. 2.

FIG. 3 shows a top view of cover 10 with air inlet openings 11 uniformly distributed across the surface, and with the adhesive foil 12 stripped off, while FIG. 4 shows a cover 10 with air inlet openings 11 concentrated in the center region; indicated here by dash lines only, as they are still sealed by an adhesive foil 12. FIG. 5 illustrates how water drainage openings 4 in bottom 6 of the absorbent receptacle 5 can likewise be sealed by an adhesive foil 12.

I claim:

1. Room dehumidifier comprising a water collector having an open top end, an absorbent receptacle removably supported within the open top end of the water collector, and a water absorbent filler formed of a hygroscopic material disposed in said absorbent receptacle; wherein said receptacle has a water drainage opening in a bottom wall thereof and an open top end; wherein the water collector and absorbent receptacle are formed by containers that are circumferentially configured with respect to each other for enabling stackable nesting of the absorbent receptacle within the water collector but which have heights which differ in a manner so as to create a water collection space within the water collector below the absorbent receptacle when the absorbent receptacle is nested within the water collector, wherein the water collector has a recessed abutment flange and the absorbent receptacle has a support flange near a bottom end thereof, said support flange being seated on said recessed abutment flange, and wherein the absorbent receptacle has a rim flange at its open top end and the distance between said rim flange and said support flange is greater than the distance between the open top end of the water collector and said recessed abutment flange, whereby said rim flange may be used for liftingly removing the absorbent receptacle from the water collector.

2. Room dehumidifier according to claim 1, wherein at least one of an upper portion of the water collector and side walls of the absorbent receptacle is of a slightly conical configuration.

3. Room dehumidifier according to claim 1, wherein the water absorbent filler in the absorbent receptacle is present in the form of a loose bulk material, and wherein a water permeable mat is disposed on the bottom wall of the absorbent receptacle for preventing passage of the loose bulk material through the water drainage openings.

4. Room dehumidifier according to claim 3, wherein the mat is formed of an absorbent material.

5. Room dehumidifier according to claim 4, wherein hook-like protusions are formed on at least one of upper and lower sides of the mat.

6. Room dehumidifier according to claim 4, further comprising a cover for the absorbent receptacle, said cover being provided with air inlet openings.

7. Room dehumidifier according to claim 6, wherein said air inlet openings are concentrated in a center region of said cover.

8. Room dehumidifier according to claim 1, further comprising a cover for the absorbent receptacle, said cover being provided with air inlet openings.

9. Room dehumidifier according to claim 8, wherein said air inlet openings are concentrated in a center region of said cover.

10. Room dehumidifier according to claim 1, wherein the water collector at its open end has a perimetric abutment flange and the absorbent receptacle has an abutment bulge at its side, the distance between said abutment bulge and said support flange being the same as the distance between the open top end of the water collector and said recessed abutment flange on said water collector, whereby said support flange and said abutment bulge simultaneously provide support for the receptacle in the water collector.

11. Room dehumidifier according to claim 6, wherein said drainage openings and said air inlet openings are covered by a removable adhesive foil.

12. Room dehumidifier comprising a water collector having an open top end, an absorbent receptacle removably supported within the open top end of the water collector, and a water absorbent filler formed of a hygroscopic material disposed in said absorbent receptacle; wherein said receptacle has a water drainage opening in a bottom wall thereof and an open top end; wherein the water collector and absorbent receptacle are formed by containers that are circumferentially configured with respect to each other for enabling stackable nesting of the absorbent receptacle within the water collector but which have heights which differ in a manner so as to create a water collection space within the water collector below the absorbent receptacle when the absorbent receptacle is nested within the water collector, wherein the water collector at its open top end has a perimetric abutment flange and the absorbent receptacle has an abutment bulge at the sides thereof, and wherein the absorbent receptacle has a rim flange at its open top end, the abutment bulge being positioned a specific distance below said rim flange and being supportably engageable on said perimetric abutment flange so as to enable said rim flange to serve as a means for liftingly removing the absorbent receptacle from the water collector.

13. Room dehumidifier according to claim 12, wherein the water absorbent filler in the absorbent receptacle is present in the form of a loose bulk material, and wherein a water permeable mat is disposed on the bottom wall of the absorbent receptacle for preventing passage of the loose bulk material through the water drainage openings.

14. Room dehumidifier according to claim 13, wherein the mat is formed of an absorbent material.

15. Room dehumidifier according to claim 14, wherein hook-like protusions are formed on at least one of upper and lower sides of the mat.

16. Room dehumidifier according to claim 14, further comprising a cover for the absorbent receptacle, said cover being provided with air inlet openings.

17. Room dehumidifier according to claim 16, wherein said air inlet openings are concentrated in a center region of said cover.

18. Room dehumidifier according to claim 16, wherein said drainage openings and said air inlet openings are covered by a removable adhesive foil.

19. Room dehumidifier according to claim 12, wherein at least one of an upper portion of the water collector and side walls of the absorbent receptacle is of a slightly conical configuration.

* * * * *